United States Patent [19]
Lemelson

[11] 4,008,490
[45] Feb. 15, 1977

[54] MULTIPLE MAGAZINE TRANSDUCING APPARATUS

[76] Inventor: Jerome H. Lemelson, 85 Rector St., Metuchen, N.J. 08840

[22] Filed: Nov. 14, 1974

[21] Appl. No.: 523,864

[52] U.S. Cl. .................. 360/94; 242/199; 360/92; 360/96; 360/132
[51] Int. Cl.² .................. G11B 23/04; G11B 15/68
[58] Field of Search ............. 360/94, 132, 137, 93, 360/96; 242/197, 198, 200, 55.19 A, 199

[56] References Cited
UNITED STATES PATENTS

| | | | |
|---|---|---|---|
| 3,594,008 | 7/1971 | Takagi | 360/94 |
| 3,638,953 | 2/1972 | Kodama | 360/96 |
| 3,684,295 | 8/1972 | Strain et al. | 360/96 |

Primary Examiner—Alfred H. Eddleman

[57] ABSTRACT

An apparatus and method are provided for recording and/or reproducing signals relative to magnetic tapes provided in magazines of different configurations. Retaining means are provided for retaining and holding magazines of two different sizes and configurations, with respect to a common magnetic transducer for recording on and/or reproducing from the tapes of both magazines, depending upon which magazine is prepositioned on a support for the transducer. A common drive means may be provided for the tape of either magazine, thereby substantially simplifying the apparatus. In another form, auxiliary drive means is provided for the tape of one magazine, which auxiliary drive operates either separately from the drive for the tape of a magazine of a different shape or cooperates therewith. A removable or retractable retaining means for one of the magazines is provided, to permit the other magazine to be held in place without intervention thereby.

8 Claims, 4 Drawing Figures

FIG. I

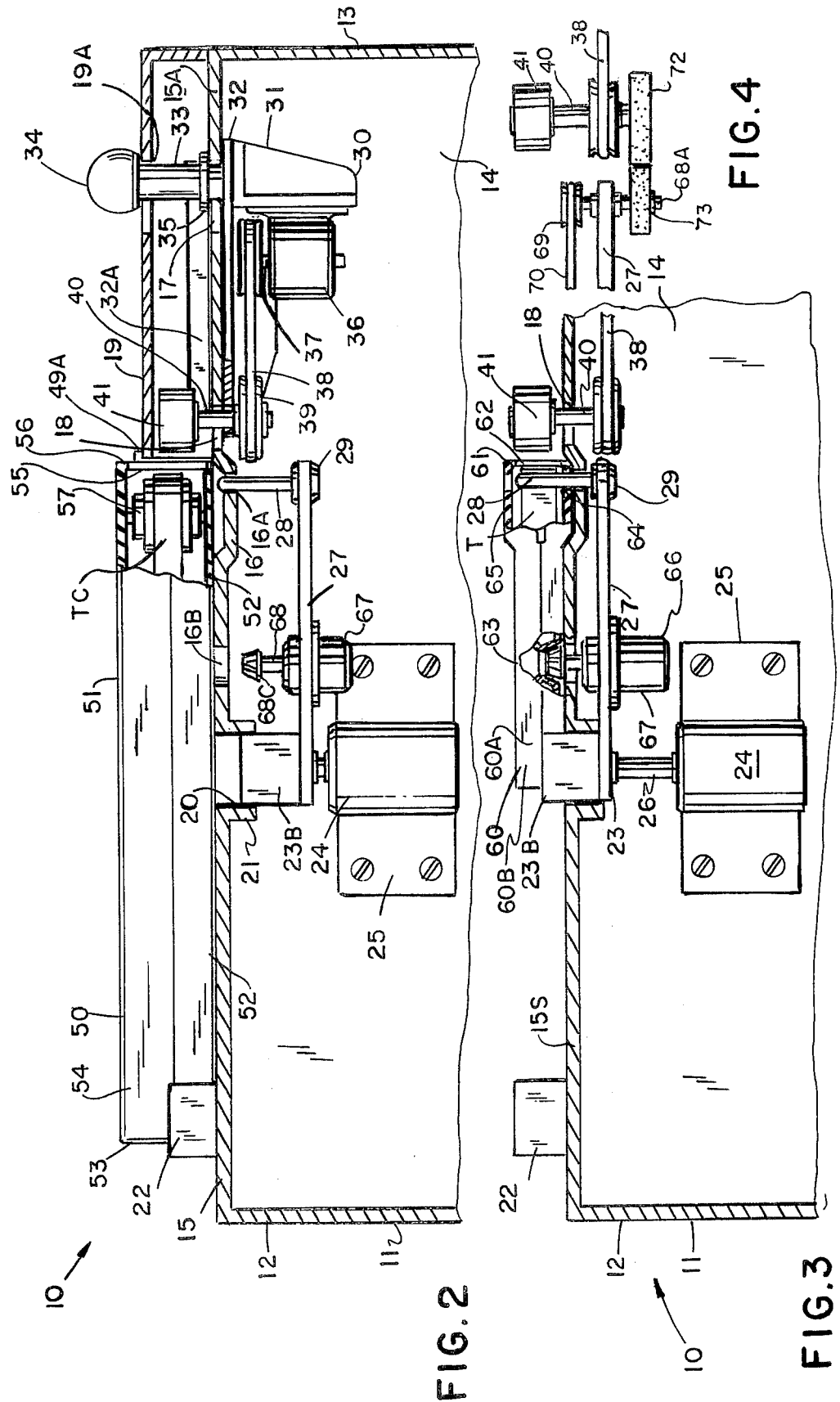

MULTIPLE MAGAZINE TRANSDUCING APPARATUS

SUMMARY OF THE INVENTION

This invention relates to an apparatus and method for recording on and/or reproducing from magnetic tapes, which are disposed in magazines of different configurations. The invention is particularly directed to an apparatus which is capable of transducing with respect to an endless magnetic tape provided in a cartridge and a magnetic tape driven between two reels, which are rotatably supported within a magazine or cassette.

The two most commonly-used magnetic tape magazines are an endless tape-containing magazine, commonly referred to as a stereo 8-track magnetic tape cartridge, and a cassette containing two reels rotatably supported therein and a tape connected to both and drivable from one to the other and, also, in reverse. The former magnetic tape cartridge is manufactured and licensed by the Learjet Corporation, of Tucson, Arizona, while the latter cassette magazine is commonly known as the Philips-Norelco type, which is manufactured by a substantial number of companies, including the North American Philips Corporation, New York, N.Y.

Each of these particular magazines is of a different configuration, the former being longer than the cassette and the cassette being slightly wider than the 8-track cartridge. Recording and play-back units for the 8-track cartridge and the cassette have been developed which are of substantially different configuration, such that the transducing unit for the cartridge will not accommodate cassettes and vice versa.

The instant invention is directed to an apparatus which is specially-constructed to accommodate on a common mount and permit transducing, either in the recording and/or reproduction mould, a signal relative to magnetic tapes provided in both cartridges and cassettes of different configurations, but each having access to the tape, thereof, through edge openings. Accordingly, it is a primary object of this invention to provide a new and improved apparatus and method for transducing signals with respect to magnetic tapes disposed in magazines of different configurations.

Another object is to provide an apparatus and method for transducing signals relative to endless wound tape cartridges and magazines or cassettes containing reel-to-reel tape drive arrangements.

Another object is to provide an apparatus and method for accommodating magnetic-tape magazines of different configurations on a common support and at locations thereon, such that a common magnetic transducer may be employed to transduce signals relative to the tapes of each.

Another object is to provide an apparatus and method for accommodating magnetic tape containing magazines of different configurations on a common support containing a single drive means and in a manner such that such single drive means may be employed to drive the tapes of the differently-configured magazines when properly supported by said common support.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 2 is a side view in partial cross section of the apparatus of FIG. 1 showing a tape cartridge thereon and FIG. 3 is a side view with parts sectioned of part of the apparatus of FIG. 1 with a magnetic tape cassette mounted thereon.

FIG. 4 is a side view of certain of the components of FIG. 3 modified to permit single motor driving thereof.

Figure 1:
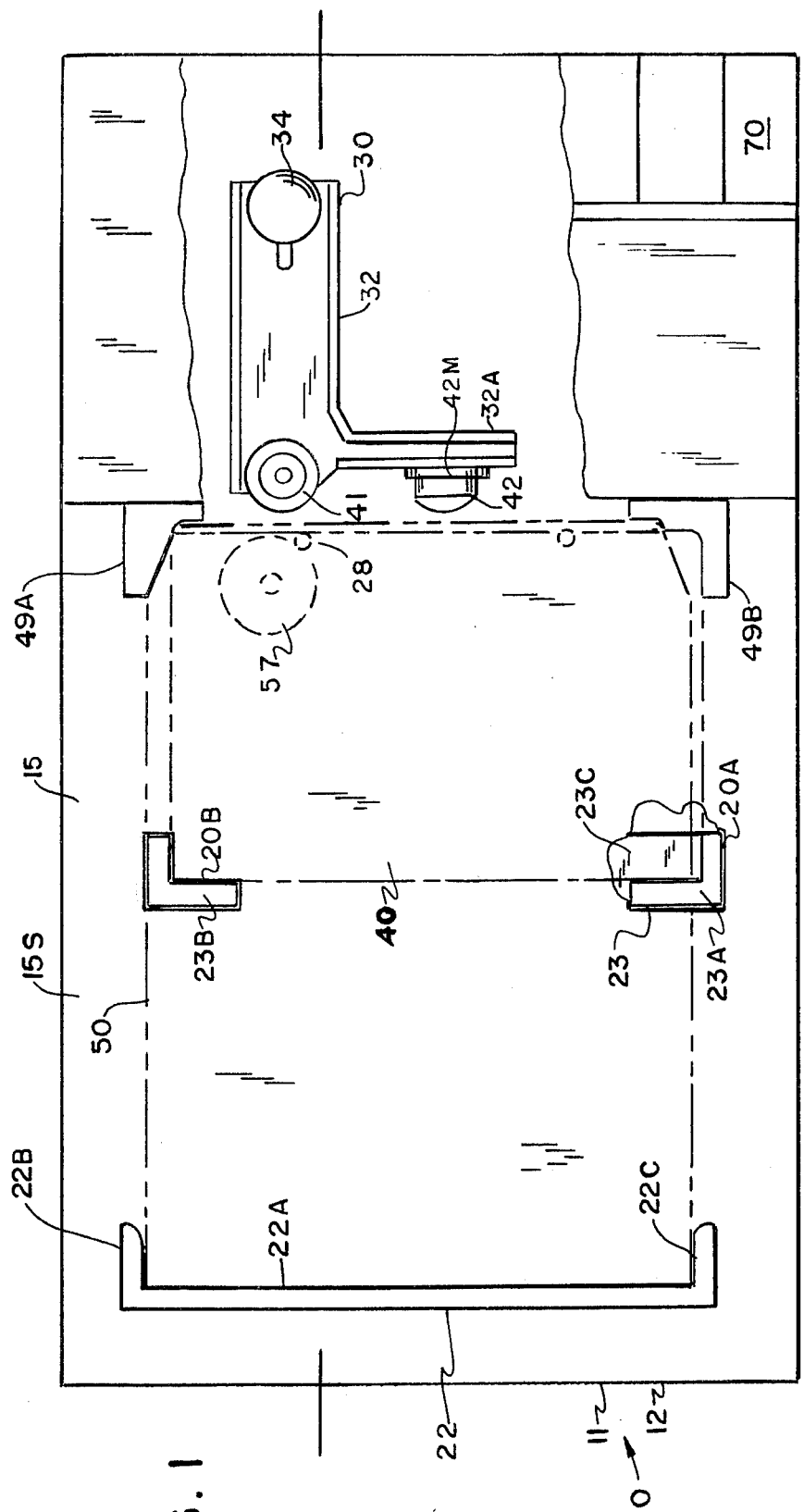
FIG. 1 is a plan view with parts broken away for clarity of a transducing apparatus for the tapes of two different types of magazines.

In FIGS. 1–3 is shown an apparatus 10, including a housing assembly 11 supporting a magnetic-tape drive and transducing apparatus for tapes contained in magazines of different configurations, such as a so-called endless-tape-containing cartridge 50 and a reel-to-reel tape-containing cassette 40, each shown in its operative location by respective broken line notations in the top view, FIG. 1. The housing assembly 11 preferably comprises a box-shaped enclosure having end walls 12 and 13, side walls, one of which 14 is shown, a top wall 15 and a bottom wall (not shown).

Attached to the top wall 15 is a first U-shaped bracket or retainer 22, for the rear end wall of a magnetic-tape cartridge 50. The retainer 22 is composed of a lateral portion 22A having extensions 22B and 22C for laterally retaining the side edge walls of a cartridge 50 against the upper surface of the top wall 15. U-shaped retainer 22 may be integrally moulded against the top wall 15, while front retainers 49A and 49B for both the front end of the cartridge 50 and the front end of a cassette 60 are secured to and preferably moulded integral with the top wall 50 a distance forward of 22, such that the tape cartridge 50 will be retained at its front and rear ends by the outwardly extending portions of 22, 49A and 49B, when the cartridge or cassette is slidably pushed down against the upper surface of wall 15 between the retainers as illustrated in FIG. 1.

Being that the cassette 60 is substantially shorter than the cartridge 50, a removable or retractable retainer 23 therefor is provided, which is supported beneath wall 15 and is adapted to be retracted below the upper surface 15S of 15, as illustrated in FIG. 2, when a cartridge 50 is operatively located on said upper surface. When it is desired to preposition and retain a tape-containing cassette on the upper surface 15S of 15, as illustrated in FIG. 3, the retainer 23 is projected upwardly through an opening or openings 20 in wall 15. The retainer 23 is illustrated as composed of a laterally-extending strip 23C, having L-shaped end portions 23A and 23B which are projectible upwardly through respective L-shaped openings 20A and 20B in the wall 15, when the shaft 26 of a bistable solenoid 24 is advanced upwardly, as illustrated in FIG. 3. The solenoid 24 is supported on a bracket 25, extending to and secured against the side wall 14 of the housing. It may be replaced by a mechanical linkage assembly, which is manually operated from the exterior of the housing by depressing or otherwise operating a lever. The solenoid 24 may be operated to upwardly project or retract the retainer 23 by manually operating control switches by depressing selected push buttons or pivoted actuators of a bank 70 thereof located at the front end of the housing 11.

When a cartridge 50 is prepositioned against the upper surface 15S of the top wall 15 of the housing 11, as illustrated in FIG. 2, an assembly 30 containing a tape-drive wheel 41 rotatably supported thereon and a magnetic-recording transducer or transducers (not shown) may be moved by engaging and pushing against a knob 34 to cause the drive wheel 41 to engage the tape TC of the cartridge 50 against an idler wheel 57, which is rotatably supported between the side walls 51 and 52 of the cartridge 50 immediately behind an opening 56 in the end-edge wall 55 of the cartridge. The wheel 41 is caused to move through the opening 56 to engage and compress the tape TC against wheel 57. A reversible gear motor 36 is supported on a bracket 31, which is attached to the main bracket 32 defining assembly 30. The bracket 32 supports a bearing for the shaft 40 of the tape drive wheel 41 and while the output shaft of motor 36 may be connected directly to shaft 40, in FIG. 2 it is illustrated as connected thereto through a pulley 37 secured to its shaft, a belt 38 and a pulley 39 connected to shaft 40.

Extending upwardly from bracket 32 through a slotted opening 17 in the forward extension 15A of wall 15 is a shaft 33 at the upper end of which is secured the control knob 34, which protrudes upwardly through a slotted opening 19A in a cover wall 19, extending above wall 15 as illustrated. A shelf 35, secured to shaft 33, slidably supports the assembly 30 on the upper surface of wall extension 15A, while shaft 33 may move toward and away from the cartridge 50 through slotted opening 17 in wall 15A. Shaft 40 also is guided back and forth in a slotted opening 18 in wall section 15A. A manually-operated switch or limit switch, which is closed when assembly 30 is pushed in the direction of the cartridge 50, although not shown in the drawings, may be employed to connect a source of electrical energy to drive motor 36 and to energize one or more transducers supported by the assembly 30, while they are in engagement with the tape of the cartridge or cassette, after being inserted through the available openings in the cartridge or cassette.

When it is desired to properly locate a cassette on the upper surface 15S of wall 15 of the housing 11, the assembly 30 is first retracted by manual manipulation of knob 34 to move wheel 41 and the transducers supported by assembly 30 away from the cartridge. The solenoid 24 is then energized to protrude its shaft 26 moving the retainer 23 upwardly through the openings 20A and 20B to the advanced position illustrated in FIG. 3. Supported at the end of an arm or plate 27 extending from the retainer 23 is a cylindrical pin 28 shown retracted in FIG. 2 and advanced in FIG. 3 to project same above the upper surface 15S. The pin 28 is rotatably supported at the end of arm 27 by means of a bearing 29 secured to said arm. When the cassette 60 is moved downwardly between projected retainers 23A and 23B and retainers 49A and 49B, the projecting pin 28 extends upwardly through an opening 64 in the side wall 63 of the cartridge to position the pin 28 immediately behind the tape T in the cassette and in alignment with wheel 41, as illustrated. Thus, when wheel 41 is advanced through the opening 62 in the end wall 61 of the cassette 60 and engages the tape T therein it compresses said tape against freely-rotatable pin 28 such that, when wheel 41 is rotated, the tape will be driven through the cassette.

Notation 16 refers to a recessed portion of the upper wall 15 adapted to accommodate the forward end portion 65 of the cassette housing 60A, which forward portion 65 is wider than the main portion 60B of the cassette housing. An opening 16A accommodates the idler pin 28 while notation 64 refers to the conventional opening in the side wall of the forward portion 65 of the cassette housing, through which the pin extends to position it behind the tape.

Also supported on bracket or arm 27 is a drive assembly 66, which includes a gear motor 67, the output shaft 68 of which is projected upwardly toward opening 16B in wall 15, which opening is in direct alignment with the hub of the take-up reel of the cartridge 60. Operatively connected to shaft 68 (not shown) is a drive arrangement for the other reel of the cassette 60, which drive arrangement may be of conventional design and may include either a second gear motor having its shaft projectible into the coupling for the hub of the other reel of the cassette simultaneously as shaft 68 is projected into its reel coupling. The drive assembly 66 may also comprise a single, reversible gear motor supported on the bracket 27 of conventional design and driving respective shafts, also supported by the bracket assembly and containing coupling means for the respective reels of a cassette which is predeterminedly located on housing 11, as shown in FIG. 3.

The output shaft 37 of the single gear motor 36 employed to rotate wheel 41 for driving the tape in cooperation with the idler wheel or pin, may also contain a resilient drive wheel which, when the assembly 30 is advanced with wheel 41 engaging the tape, engages and drives a shaft similar to shaft 68 for driving the take-up wheel of the cassette when the coupling means thereof is engaging the take-up wheel hub, as in FIG. 3. This particular arrangement is illustrated in FIG. 4, wherein the shaft 40 contains a resilient wheel 72 connected thereto for engaging a wheel 73, which is rotatably supported by arm assembly 27 and drives a shaft 68A, also rotatably supported by 27, the end of which shaft is operable to directly or indirectly drive one of the hubs of the reels of a reel-to-reel cassette 60 disposed as shown in FIG. 3 in operative location on the upper wall 15. In FIG. 4, a pulley 69 is secured to the upper end of shaft 68A and is connected by a belt 70 to a shaft similarly located as is shaft 68 and with a similar coupling at its end for driving the hub of the cassette take-up reel in a tape winding operation. Belt 70 or shaft 68A may also be connected to a suitable mechanism including a clutching arrangement operated by a mechanism including lever means for selectively power rotating one of two shafts supported on arm 27A which shafts contain respective couplings and are located to permit said couplings to engage respective of the hub couplings for a cassette when operatively located as shown in FIG. 3. Thus the single motor 36 may be employed to both power rotate the wheel 41 for driving the tape of a cassette past the opening in its edge wall and the reel or reels of the cassette to take up the tape so driven.

Shown in FIG. 1 as supported by an extension 32A of the bracket 32 is a magnetic pick-up head or transducer 42 which is adapted to simultaneously engage a portion of the tape of that magazine (e.g. cassette or cartridge) which is operatively located on the top wall 15, as the driven wheel 41 engages another portion of said tape. The transducer 42 may be provided on a stationery mount 42M and fixedly secured thereto or adapted to move thereon and be shifted laterally across the tape of a cartridge or cassette for selectively engaging different tracks of the tape, by a mechanism of conventional design such as provided for the Lear-Jet magnetic tape cartridge player unit. In such an arrangement suitable electrical controls may be provided to bring the head or heads 42 into engagement with the suitable track portion of a cassette operatively located on the housing 11 wherein such electrical controls may comprise push button finger operated switches and/or limit switches actuated by either or both a cartridge and cassette when placed in operative location on the upper wall 15 as shown. In other words arm extension 32A may contain a solenoid or motor for selectively driving the head 42 to position it or a plurality of such heads at different track locations above the upper surface 15S for transducing with respect to selective tracks of the tapes of either a multiple track endless tape cartridge of the type described or a multiple track tape cassette.

In yet another embodiment of the instant invention (not illustrated), it is noted that shaft 40 on which the tape drive wheel 41 is supported may be extended either upwardly from said drive wheel to a gear train or downwardly into the housing 11 to a gear train which is connected to an output shaft which is connected to a record disc turntable or a coupling device to which such as turntable may be connected either above the housing 11 or within the confines thereof. Shaft 37 of gearmotor 36 may also be connected to such a described gear train which is connected to a record disc turntable or may be connected to such a turntable directly depending on the rotational speed of said gearmotor, thus providing the apparatus 10 capable of playing back recordings from record discs, tape cartridges and tape cassettes.

It is also noted that the solenoid 24 may be replaced by a motor driven mechanism which is selectively operated either by a switch on the control panel or housing 11 or by a limit switch activated when a cassette is placed on the housing 11 in the operative position shown in FIG. 3.

The solenoid 24 may also be eliminated by one of two additional mechanisms such as a mechanical means for raising and lowering the assembly which includes the plate or arm 27 when a pivoted lever is manually actuated from the exterior of the housing. It is also noted that the assembly, including plate 27, guides 23A and 23B for the cassette, pin or drum 28 and the motor 66 or means for selectively rotating the reels of a cassette, may be spring mounted to normally retain said assembly in the projected position shown in FIG. 3 so as to normally accommodate a magnetic tape cassette which is manually aligned above and guided downwardly from above the top wall 15 to the position shown in FIG. 3. When a magnetic tape cartridge such as magazine 50 is pushed downwardly to the operative location shown in FIG. 2 its lower wall engages the inwardly extending legs of the movable guides 23A and 23B and pushes the entire assembly including said guides downwardly into the housing against the upwardly directed force of a spring or springs urging said assembly upwardly and supported by a bracket or brackets extending from the wall or walls of the housing. When the cartridge 50 is removed from the upper wall 15, the assembly including plate 27 is spring urged upwardly to the position shown in FIG. 3.

I claim:

1. An apparatus for transducing information with respect to magnetic tape contained within a plurality of magazines defined by respective substantially rectangular containers of different configurations including a first container the dimensions of which are smaller than those of a second container and wherein each container has openings along an edge wall thereof to permit access to the tape therein, comprising:
 a support including a housing,
 magnetic transducing means movably supported by said support,
 said support having an upwardly facing wall portion and first means supported by said wall portion for retaining when abutted thereagainst each magnetic tape magazine with its wall containing said openings positioned at an operative location on said housing,
 second retaining means movably supported by said support and means for moving said second retaining means from a retracted position whereby it is below the upper surface of said upwardly facing wall portion of said housing and out of the way of a magazine disposed on said upwardly facing wall portion to a position whereby a portion of said second retaining means protrudes beyond said upper surface and serves to engage and cooperate with said first retaining means in predeterminately locating and retaining said first magazine in its operative location on said upwardly facing wall portion during a transducing operation,
 third retaining means supported by said support for abutting and retaining a portion of the wall of the larger of said magazines so as to cooperate with said first retaining means in predeterminately locating said larger magazine on said support, and means for moving said transducing means from a first position wherein it is out of contact with the magnetic tape of a magazine disposed at said operative location to a second positioned wherein said transducing means engages said magnetic tape through an opening along said edge wall thereof.

2. A magnetic transducing apparatus in accordance with claim 1 including a first electrically operated motor means located below said upwardly facing wall portion of said housing and operatively connected to said second means for advancing and retracting said second means to protrude a portion thereof beyond said upper surface of said upwardly facing wall portion and to draw said portion below said upper surface.

3. A magnetic transducing apparatus in accordance with claim 2 wherein said electrically operated motor means comprises a bistable solenoid.

4. A magnetic transducing apparatus in accordance with claim 2 wherein the smaller of said magazines contains supply and takeup reels for the magnetic tape thereof and first coupling means for said supply and takeup reels accessible to the outside of the housing of said smaller magazine, a second support operatively connected to said second means, second motor means supported by said second support and shaft means driven by said second motor means including second coupling means for connecting said shaft means to said first coupling means when said smaller of said magazines is operatively located on said upwardly facing wall of said housing, and an opening in said upwardly facing wall portion of said housing through which opening said second coupling means may pass and engage said first coupling means of a magazine operatively located on said support.

5. A magnetic transducing apparatus in accordance with claim 1 wherein said second and third means are respectively operable to engage portions of the edge walls of said magazines which are opposite those edge wall portions thereof containing said openings therein.

6. A magnetic transducing apparatus in accordance with claim 1 wherein said first means comprises a pair of L-shaped retainers which are located and operable to engage respective corner portions of each of said first and second containers when each is operatively located on said support.

7. A magnetic transducing apparatus in accordance with claim 1 wherein said second means comprises a pair of L-shaped retainers located to respectively engage respective opposite corners of the smaller of said magazines, which corners are located opposite said edge wall portion of said magazine containing said openings therein.

8. A magnetic transducing apparatus in accordance with claim 1 wherein said third means comprises a U-shaped retainer for the rear and side edge wall portions of the housing of the larger of said magazines which are opposite the edge wall portion thereof containing said openings therein.

* * * * *